United States Patent
He et al.

(10) Patent No.: US 6,906,886 B2
(45) Date of Patent: Jun. 14, 2005

(54) PEAK TO PEAK DETECT METHOD TO PROTECT SEEK/SETTLE INDUCED ENCROACHMENT

(75) Inventors: Jianbo He, Longmont, CO (US); Gregory Christopher Labbe, Longmont, CO (US); Avanindra Annu Gupta, Louisville, CO (US); Sandeep Dominic Sequeira, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 107 days.

(21) Appl. No.: 10/657,792

(22) Filed: Sep. 8, 2003

(65) Prior Publication Data
US 2005/0052775 A1 Mar. 10, 2005

(51) Int. Cl.[7] .............................................. G11B 5/58
(52) U.S. Cl. .................................................. 360/77.01
(58) Field of Search .......................... 360/77.01, 77.02, 360/75

(56) References Cited

U.S. PATENT DOCUMENTS

| | | | |
|---|---|---|---|
| 4,135,217 A | | 1/1979 | Jacques et al. |
| 4,823,212 A | | 4/1989 | Knowles et al. |
| 5,262,907 A | | 11/1993 | Duffy et al. |
| 5,307,330 A | | 4/1994 | Okamura |
| 5,444,583 A | | 8/1995 | Ehrlich et al. |
| 5,654,841 A | | 8/1997 | Hobson et al. |
| 5,680,272 A | * | 10/1997 | Kadlec et al. ........... 360/78.04 |
| 5,867,340 A | | 2/1999 | Morehouse et al. |
| 6,178,058 B1 | | 1/2001 | Pan et al. |
| 6,294,891 B1 | | 9/2001 | McConnell et al. |
| 6,510,015 B2 | | 1/2003 | Ellis et al. |
| 6,549,349 B2 | | 4/2003 | Sri-Jayantha et al. |

* cited by examiner

*Primary Examiner*—David Hudspeth
*Assistant Examiner*—Mitchell Slavitt
(74) *Attorney, Agent, or Firm*—David K. Lucente; Derek J. Berger

(57) ABSTRACT

A system and method for improving write integrity of a magnetic storage system. A settling algorithm counter is reset if a position error signal of the write head indicates the head is vibrating with mechanical oscillations outside a predetermined threshold.

19 Claims, 4 Drawing Sheets

PEAK TO PEAK DETECT METHOD TO PROTECT SEEK/SETTLE INDUCED ENCROACHMENT

FIELD OF THE INVENTION

The present invention relates generally to magnetic storage technology. More particularly, the present invention relates to protecting data integrity from mechanical resonance in a magnetic storage system.

BACKGROUND OF THE INVENTION

Technological advances in magnetic storage allow data to be stored in ever smaller physical dimension. For example, track widths in magnetic tape or disk storage have become so small that mechanical vibrations which once were irrelevant can now cause writing errors. For example when a read/write head positions itself over a desired track, oscillations on the mechanical structure of the head can be large enough that a write function writes data outside the allowed track width, resulting in write error.

When a read/write head operates, it is moved in a seek operation. This operation locates and moves the head to the proper position for, e.g., writing data. When the seek operation ends and the head is in position, there is a time period during which vibrations in the head must be allowed to settle. To deal with problems of this nature, settling algorithms are typically used which monitor the transient response and attempt to prevent write operations until the settling is completed. Shorter settling times typically permit more errors, while longer settling times, though less error prone, increase access and/or write time for the apparatus. Hence, settling times are typically kept as short as possible while still preventing as many errors as possible.

Non-consecutive settling algorithms employ multiple samples to determine whether settling has occurred. For example, if 2 consecutive position error signal (PES) samples are within 8% of track pitch and the corresponding velocity is within 6% of track pitch, then a settling counter of the algorithm is decreased by one. If this happens a predetermined number of times (e.g., 8 times in some implementations) the settling count reaches zero and settling is considered complete.

While such algorithms greatly decrease write error rate, certain frequency mechanical oscillations can still cause the settling algorithm to fail. For example, seek-induced coil bending resonance creates mechanical oscillations in the range of 900–1600 Hz, which can cause write errors despite the settling algorithm. The consequences of failure lead directly to reliability failure due to data encroachment outside the desired track, caused by data written with marginal PES.

Hence, the present state of the art would benefit from improvements to write operations that further limit these errors without unnecessarily extending the delay in write operations.

The present invention provides a solution to this and other problems.

SUMMARY OF THE INVENTION

The present invention involves a system and method for improving alignment of heads in magnetic storage systems. In a preferred embodiment, an algorithm is implemented that detects movement by the head outside a threshold, indicating the head is not yet settled. In a preferred embodiment, this information is obtained from the PES. Upon detecting such movement outside the threshold, the settling counter is reset so that the settling algorithm continues to run. Thus, the present invention provides a way to determine if settling is complete, and resets it if it is not.

This innovation provides a check on the settling algorithm, and thus prevents data writing if the drive is oscillating. It also allows normal operation of the settling algorithm if there is no oscillation, and is hence invisible when it is not needed.

In one example embodiment, the present invention detects the peak to peak movement of the write head by monitoring a PES signal. If movement (for example) is beyond a threshold distance from track center, the settling counter is reset. Noise and other irrelevant signals such as high frequency vibrations that will not affect alignment are preferably filtered by incorporating a low pass filter on the peak to peak detector.

The present invention also can be implemented as a computer-readable program storage device which tangibly embodies a program of instructions executable by a computer system to implement the innovative system and method.

These and various other features as well as advantages which characterize the present invention will be apparent upon reading of the following detailed description and review of the associated drawings.

BRIEF DESCRIPTION OF THE DRAWINGS

FIGS. 7-1 and 7-2 show flow charts for implementing a preferred embodiment of the present invention.

DETAILED DESCRIPTION

Figure 1:
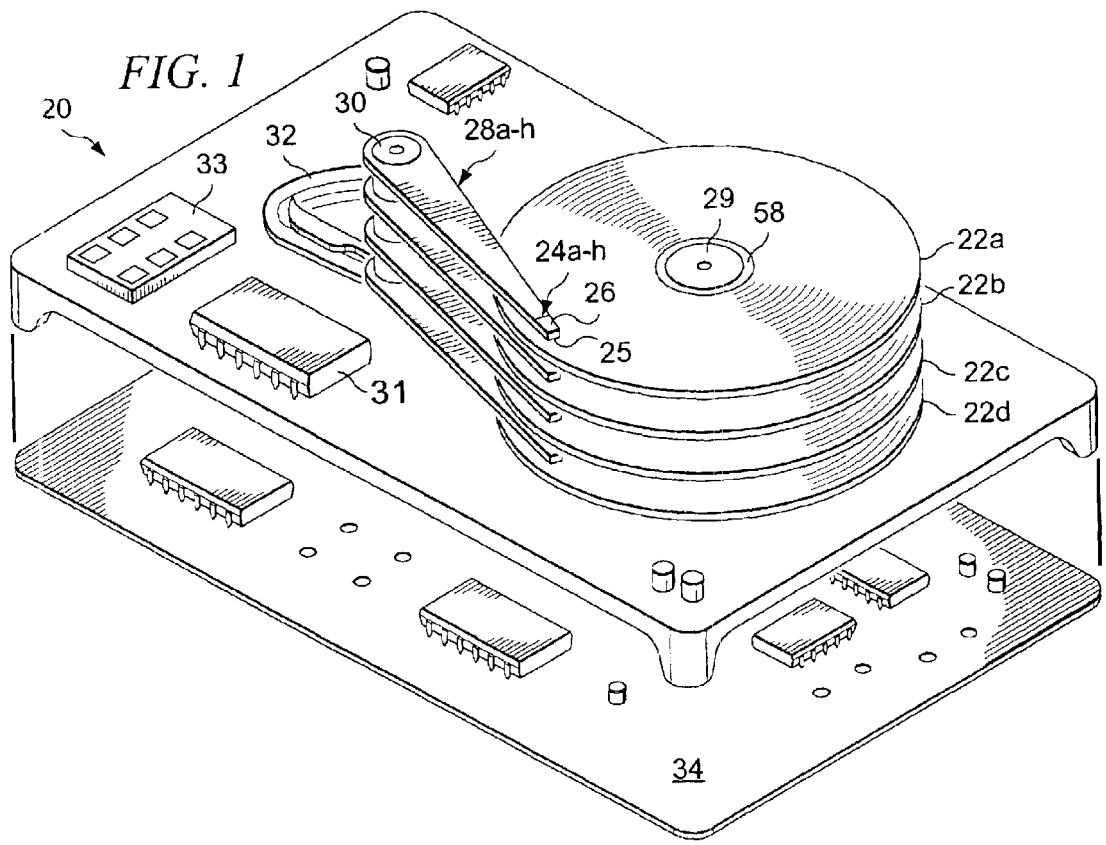
FIG. 1 is a diagram of a magnetic disk drive consistent with a preferred embodiment.

Referring now to the drawings, and initially to FIG. 1, there is illustrated an example of a disc drive designated generally by the reference numeral 20. The disc drive 20 includes a stack of storage discs 22a–d and a stack of read/write heads 24a–h. Each of the storage discs 22a–d is provided with a plurality of data tracks to store user data. As illustrated in FIG. 1, one head is provided for each surface of each of the discs 22a–d such that data can be read from or written to the data tracks of all of the storage discs. The heads are coupled to a pre-amplifier 31. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically used in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Figure 2:
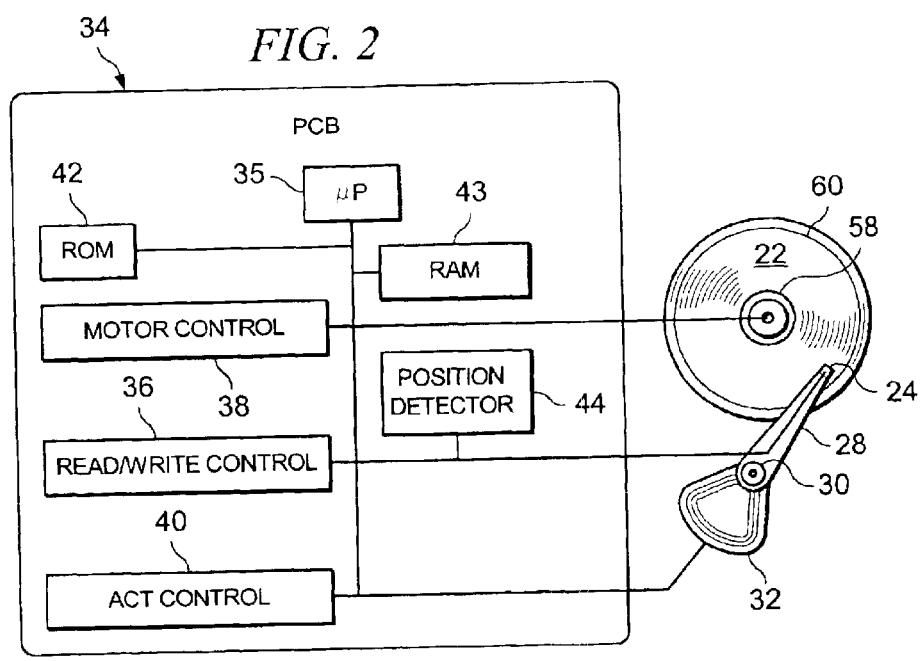
FIG. 2 is a block diagram of the printed circuit board of the magnetic disk drive system.

Referring now to FIG. 2, there is illustrated in schematic form of the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage. Position detector 44 also accepts output from the head 24 that charts the head movement in both position and time to ultimately create a position error signal (PES).

The present invention incorporates a method of detecting peak to peak distance of a PES signal during settling mode. The PES signal is monitored to detect two consecutive PES peak values (a positive and a negative peak) and if the peaks are outside a predetermined threshold, then the settling count is reset or the settling criteria are reinitialized.

A further implementation includes checking the time distance between the two consecutive peaks. If the two peaks are within a predetermined time of one another (indicating the oscillations are above a predetermined frequency) then the response is ignored. This feature helps ensure that high frequency noise that will not affect head alignment do not trigger resetting of the settling algorithm. This feature can also be implemented as a low pass filter in some embodiments, as detailed further below.

Figure 3:
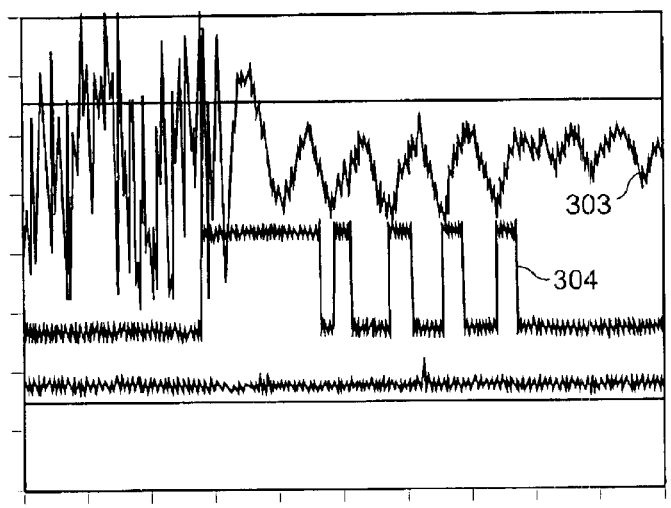
FIG. 3 shows an oscilloscope capture of a PES output demonstrating settling of a write head.

FIG. 3 shows an oscilloscope capture of a PES output. The horizontal axis unit is time, the vertical axis unit is distance perpendicular to the track. In this example, a single drive head trace is shown. Trace D 302 is the PES output, trace B 304 is the settling window. When trace B is high, the head is moving through tracking mode or otherwise is not settled. When trace B is at a low level, the servo is either in seek mode or in track follow mode, and the head is considered settled by the system, meaning write is allowed. In track follow mode, read/write firmware allows writing data to the disc. In FIG. 3, the data begins (on the left of the graph) with the PES going through high frequency oscillations. These oscillations decrease in frequency, at which time the system enters settling mode (where trace B goes high). The servo switches from tracking mode back to settle mode several times before it finally stays within tracking mode. Note the multiple short duration transitions from high to low of the B trace. These oscillations will cause data to be written with marginal PES, or even PES slightly above threshold because of the time delay before the servo is made aware that the PES is outside the settling threshold. Hence, in this example, data is written during time periods when the settling algorithm is unaware of large PES values.

Figure 4:
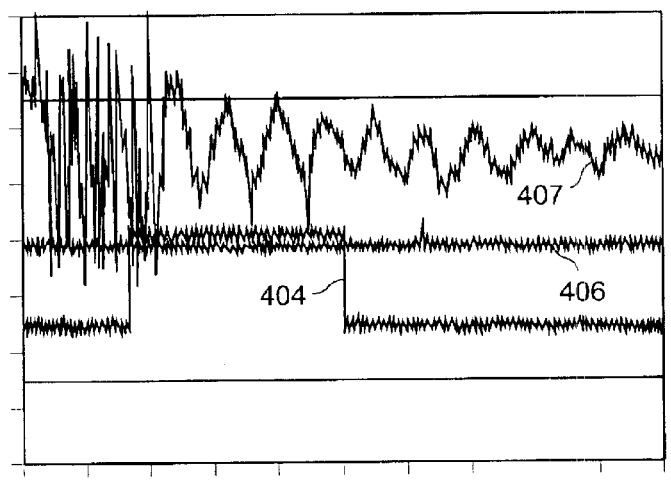
FIG. 4 shows an oscilloscope capture of a PES output implementing a preferred embodiment of the present invention.

FIG. 4 shows a scope capture showing the results of the present innovation. Again, trace D 402 is the PES, which oscillates with similar frequency as in FIG. 1 when it enter settling mode. Trace B 404, the settling window, stays in settling mode until the PES oscillation amplitude falls within a threshold track pitch peak to peak value. In this example, a threshold of 24% track pitch is used. The pulses of trace C 406 indicate where the peak to peak detection algorithm is functioning, resetting the settling count. On the left half of the graph, where the PES 402 is not settled within threshold levels, trace B 404 shows a high (unsettled) state. But note that trace C indicates the settling count is reset a number of times during trace B's high period. The resetting of the count is indicated in trace C by the spikes, which are aligned with the PES signal where it goes beyond the threshold.

Figure 5:
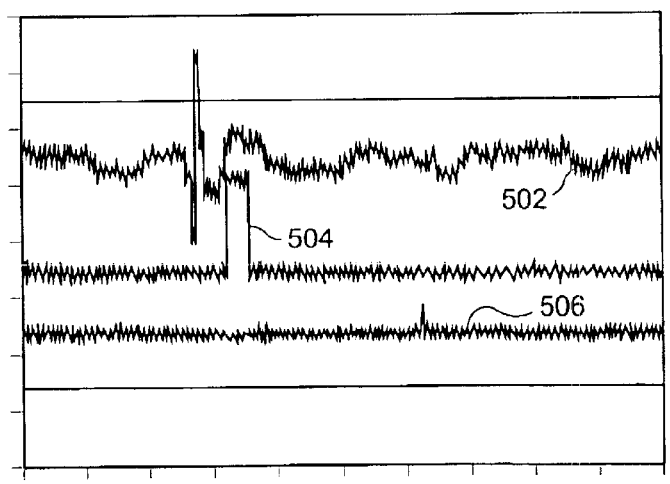
FIG. 5 shows an oscilloscope capture of a PES output implementing a preferred embodiment of the present invention.

In a preferred embodiment, the present invention is invisible to the system in cases where it is not needed. In other words, the peak to peak detection function should not delay writing in situations where it is not invoked. FIG. 5 shows a scope capture demonstrating this property for the presently preferred embodiment. This figure shows a sequential seek/settling scope capture where the coil bending mode was not excited, shown by trace D 502. The smooth PES transient from settle to track follow mode is shown by trace B 504, which has one section in a high state (depicting unsettled tracking mode). Since there are no transient peak movements outside the threshold, trace C 506, which represents detection of peak to peak distance beyond the threshold, shows no movement. Hence, the present invention does not affect normal operation of the write head unless settling failure is indicated.

Figure 6:
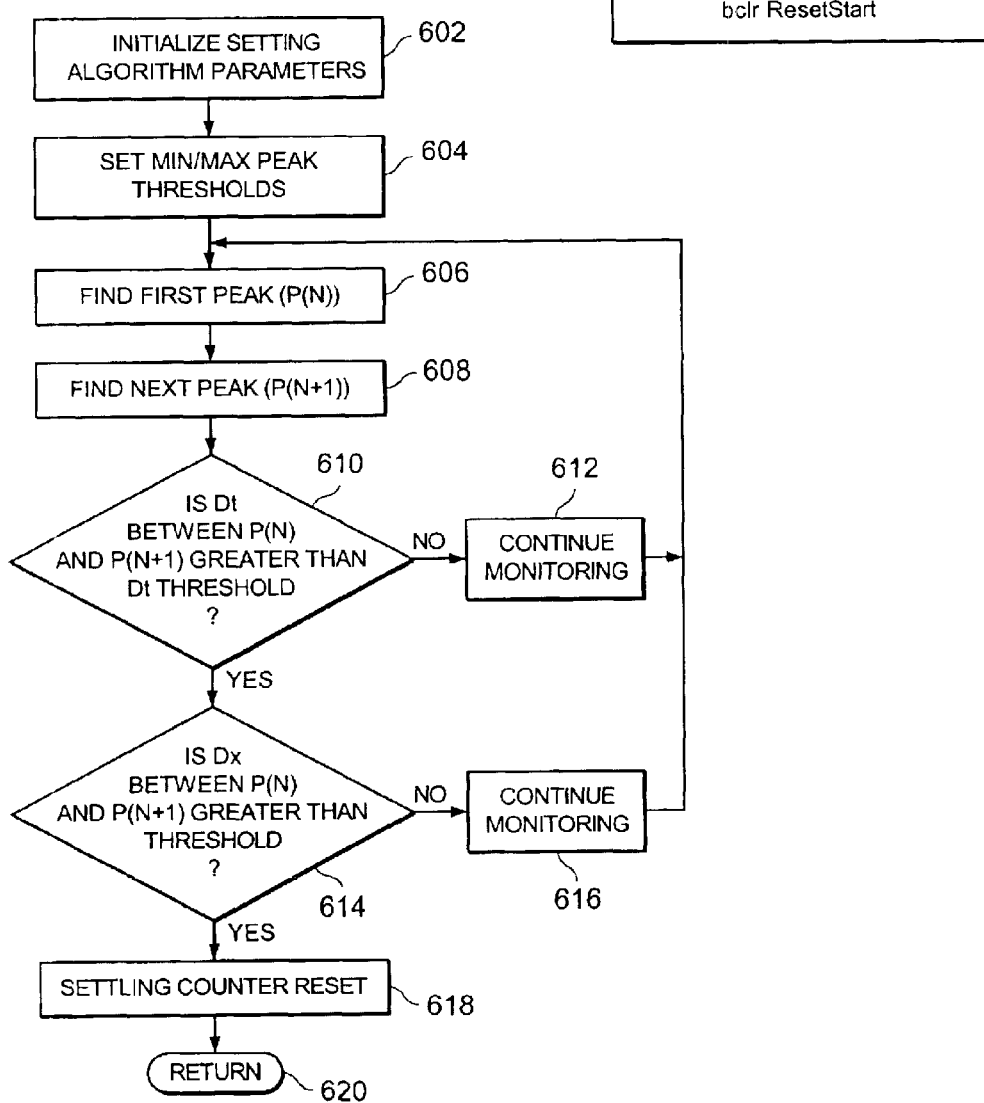
FIG. 6 shows a flow chart for process steps implementing a preferred embodiment of the present invention.
Figures 2, 7:
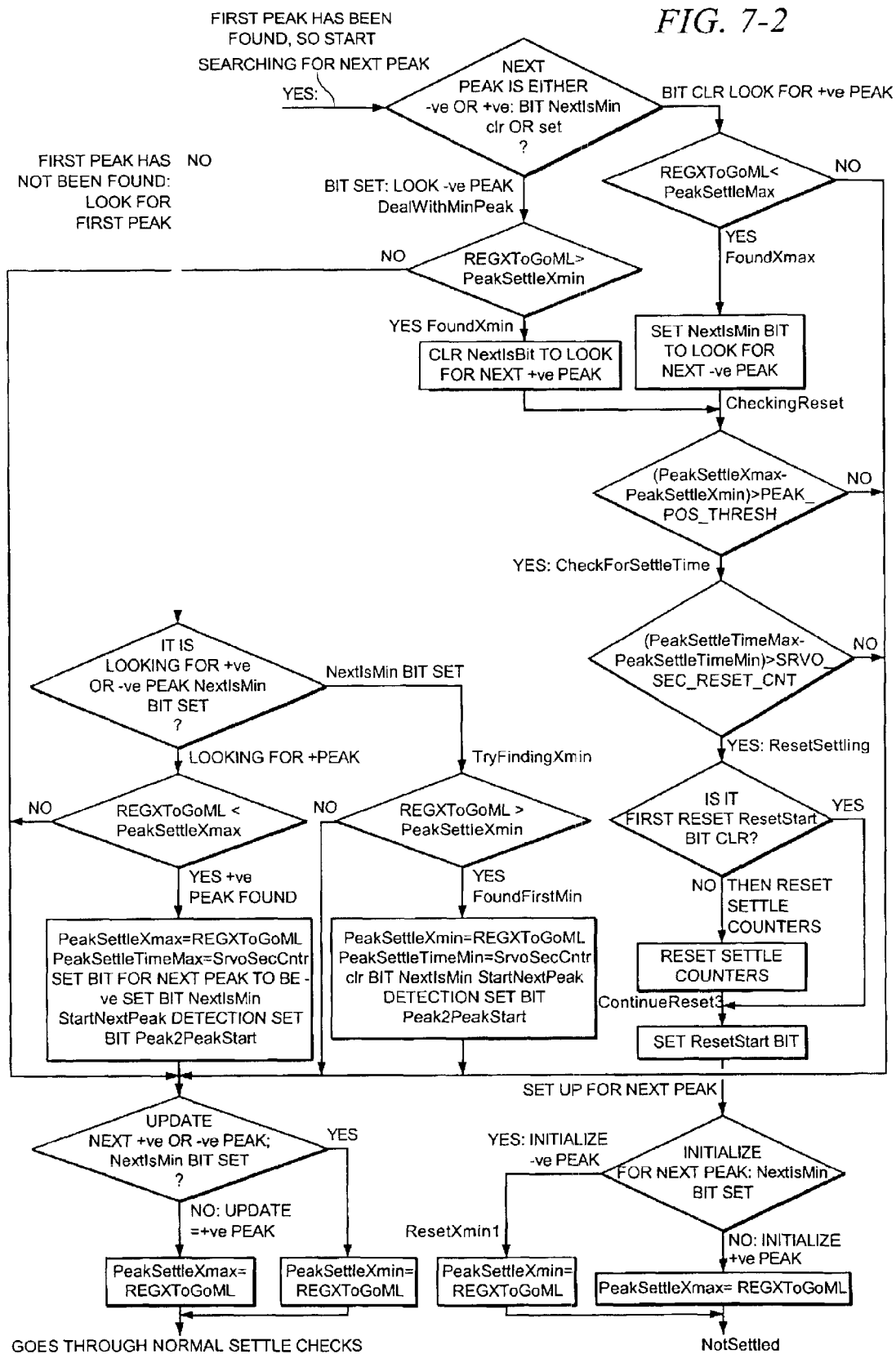

FIG. 6 shows a flow chart for a process implementing a preferred embodiment of the present invention. In a preferred embodiment, the present invention is implemented in the servo actuator control 40. It should be noted that other implementations are possible. The preferred example process starts with initialization of the settling algorithm parameters, including the settling algorithm count (step 602). Next, the threshold value for allowed offset of the read/write head is set, preferably by setting a minimum and maximum value for the peak thresholds (step 604). The first peak is detected (step 606) then the following peak is detected (step 608). A determination is made whether the time difference between the two peaks is greater than a predetermined time threshold (step 610). If the time difference between the occurrence of the two peaks is below a predetermined time threshold, then the process returns (step 612). This step allows filtering of high frequency noise from the response, and helps prevent invocation of the settle counter reset when unnecessary. If the time difference is above the predetermined time threshold, indicating a relatively low frequency (~900–1600 Hz) mechanical resonance oscillation, then the process checks the distance between the two peaks to determine if the peak to peak maximum is beyond the allowed threshold (step 614). If the peak to peak distance is within the threshold, the process returns (step 616) and continues monitoring peak to peak distance. If the peak to peak distance is outside the threshold, the settling counter of the settling algorithm is reset (step 618). The process then returns to monitoring peak to peak distance (step 620).

The present invention guarantees that data is written with a small PES by tuning the peak to peak value limit. In an alternative embodiment, a low pass filter is added. Such a filter makes the detection algorithm more robust to high frequency noise, and prevents resetting of the settling algorithm due to such noise. A low pass filter can also be used in lieu of or in addition to the minimum time between peaks threshold discussed in FIG. 6. Both implementations filter out high frequency noise. Also in a preferred embodiment, the first peak detected by the detection algorithm is ignored because it is typically caused by normal tracking overshoot/undershoot. Eliminating the first peak detected from consideration prevents resetting of the settling algorithm counter when tracking overshoot/undershoot occurs but when no mechanical vibrations are present. This reduces the number of times the settling counter is reset in situations where resetting is not necessary.

It should be noted that although the preferred embodiment shows the time threshold between peaks is determined in the process before the physical distance between the peaks is determined, the order of these two determinations can be varied, detecting peak to peak distance before the time, for example.

Figures 1, 7:
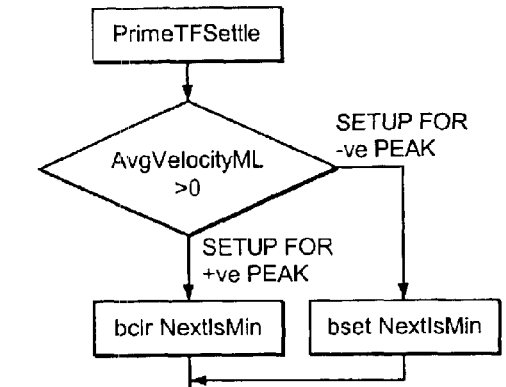

FIGS. 7-1 and 7-2 show a preferred implementation of the present invention. This example shows a protective peak to peak detect algorithm that works on top of existing settling criteria, without generating drive performance loss for cases where the protective algorithm is not invoked. The algorithm is preferably robust to high frequency noise which might be caused by electrical noise or servo channel demodulation errors. Preferably there is no logical code change for any existing non-consecutive settling criteria. The protective algorithm is preferably designed to capture multiple frequencies, for example, in the 900 Hz to the 1600 Hz range. It preferably also does not generate false triggers caused by normal seek arrival induced PES over or undershoot.

In the flow of FIGS. 7-1 and 7-2, the following terms are used.

PrimeTFSettle: it is code subroutine name, where some parameters used to qualify a seek/settle process will be initialized.

AvgVelocityML: header moving average velocity Bset/bclr: set/clear a bit (assembly code)

NextIsMin/Peak2PeakStart/ResetStart: bit variable defined in the assembly code

REGXToGoML: header moving position error variable

PeakSettleXmin: variable defined in the code for negative peak

PeakSettleXmax: variable defined in the code for positive peak

TrkFollowSetl: code subroutine name where qualifies settling process

PeakSettleTimeMin: variable defined to recode time when negative peak happens

PeakSettleTimeMax: variable defined to recode time when positive peak happens

PEAK_POS_THRESH: constant value defined in the code for peak to peak threshold

SRVO_SEC_RESET_CNT: constant value defined in the code for timing threshold between peak to peak Reset Settle Counts: code label where the algorithm is trigged and reset the settling qualification FIG. 7-1 generally shows an algorithm for initialization of the innovative process. The settling algorithm parameters are initialized and criteria for the peak to peak protective algorithm are also set. FIG. 7-2 shows an example algorithm for implementation of the innovative process to determine whether the head is settled.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising steps of:
   detecting a first peak of a position error signal of a write head;
   detecting a second peak of the position error signal of the write head, the second peak following the first peak and being of opposite sign with respect to the first peak; and
   comparing a distance between the first and second peaks with a distance threshold.

2. The method of claim 1, further comprising:
   comparing a time duration between the first and second peaks with a time threshold.

3. The method of claim 2, further comprising:
   if the duration between the first and second peaks is greater than the time threshold and if the distance between the first and second peaks is greater than the distance threshold, resetting a settling algorithm.

4. The method of claim 1, further comprising:
   if the distance between the first and second peaks is greater than the distance threshold, resetting a settling algorithm.

5. The method of claim 4, wherein the step of resetting the settling algorithm comprises resetting a counter of the settling algorithm.

6. The method of claim 1, wherein a low pass filter filters out high frequency oscillations from the position error signal.

7. A method for controlling operations of a storage device, the method comprising steps of:
   detecting a position error signal of a head of the storage device, the position error signal having at least two consecutive peaks of opposite sign;
   comparing a distance between the two consecutive peaks to a distance threshold;
   delaying a write operation if the distance between the two consecutive peaks is greater than the distance threshold.

8. The method of claim 7, wherein the write operation is only delayed if a duration between the two consecutive peaks is greater than a time threshold.

9. The method of claim 7, wherein the write operation is delayed by resetting a settling counter of a settling algorithm.

10. The method of claim 7, further comprising a filter which filters high frequency oscillations out of the position error signal.

11. A storage system, comprising:
    a storage medium having locations;
    a head capable of writing to the storage medium; and
    a position detection system for producing a position error signal of the head relative to the locations of the storage medium;
    wherein if the position error signal includes two peaks outside a position error threshold, a write operation is halted.

12. The system of claim 11, wherein the two peaks are consecutive opposite sign peaks.

13. The system of claim 11, wherein the write operation is halted by resetting a counter of a settling algorithm.

14. The system of claim 11, further comprising a low pass filter that filters out high frequencies of the position error signal.

15. The system of claim 11, wherein the write operation is only halted if the two peaks are consecutive peaks of opposite sign and if the two peaks occur with at least a predetermined amount of time between them.

16. A method of comprising the steps of:
    detecting a position error signal of a head in a magnetic storage system relative to tracks of the magnetic storage system;
    resetting a settling algorithm if the position error signal detects mechanical oscillations of the head outside a predetermined position error signal threshold.

17. The method of claim 16, wherein the step of resetting the settling algorithm comprises resetting a counter of the settling algorithm.

18. The method of claim 16, wherein the settling algorithm is reset only if the head moves outside the predetermined position error signal threshold with a frequency above a predetermined frequency.

19. The method of claim 16, further comprising a low pass filter that filters frequencies above 1600 Hz from the position error signal.

* * * * *